United States Patent
Zeng et al.

(10) Patent No.: US 12,218,378 B2
(45) Date of Patent: Feb. 4, 2025

(54) BATTERY, ELECTRIC DEVICE, MANUFACTURING METHOD AND MANUFACTURING SYSTEM FOR BATTERY

(71) Applicant: CONTEMPORARY AMPEREX TECHNOLOGY (HONG KONG) LIMITED, Hong Kong (CN)

(72) Inventors: Yuqun Zeng, Ningde (CN); Liwen Jiang, Ningde (CN); Wumei Fang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 17/976,744

(22) Filed: Oct. 28, 2022

(65) Prior Publication Data
US 2023/0050668 A1    Feb. 16, 2023

Related U.S. Application Data

(63) Continuation of application No. PCT/CN2020/115022, filed on Sep. 14, 2020.

(51) Int. Cl.
*H01M 50/367* (2021.01)
*H01M 50/143* (2021.01)
(Continued)

(52) U.S. Cl.
CPC ....... *H01M 50/367* (2021.01); *H01M 50/143* (2021.01); *H01M 50/169* (2021.01);
(Continued)

(58) Field of Classification Search
CPC .................. H01M 50/271; H01M 50/358
See application file for complete search history.

(56) References Cited

U.S. PATENT DOCUMENTS

| 4,053,683 A | 10/1977 | Rounds |
| 10,141,554 B2 * | 11/2018 | Khandelwal ........ H01M 50/204 |

(Continued)

FOREIGN PATENT DOCUMENTS

| CN | 102656718 A | 9/2012 |
| CN | 102842689 A | 12/2012 |

(Continued)

OTHER PUBLICATIONS

The International search report for PCT Application No. PCT/CN2020/115022, dated Jun. 21, 2021, 11 pages.
(Continued)

*Primary Examiner* — Amanda J Barrow
(74) *Attorney, Agent, or Firm* — East IP P.C.

(57) ABSTRACT

This disclosure provides a battery, an electric device, a manufacturing method and a manufacturing system for the battery. The battery includes a battery module, a casing, and a flow guide member. The battery module includes an explosion-proof assembly. The casing accommodates the battery module. The casing includes a gas discharge passage. The gas discharge passage includes a gas inlet and a gas outlet. The flow guide member is disposed inside the casing and shields the explosion-proof assembly to form a gas guide passage. The gas guide passage is in communication with the gas inlet, for guiding gas generated by the battery module to an exterior of the casing through the gas outlet after the explosion-proof assembly is destroyed. This disclosure intends to solve the technical problem of use safety of the battery being seriously affected due to the battery being prone to catching fire quickly and then exploding.

16 Claims, 9 Drawing Sheets

(51) Int. Cl.
  *H01M 50/169* (2021.01)
  *H01M 50/578* (2021.01)
  *H01M 50/581* (2021.01)

(52) U.S. Cl.
  CPC ....... *H01M 50/578* (2021.01); *H01M 50/581* (2021.01); *H01M 2220/20* (2013.01)

(56) References Cited

U.S. PATENT DOCUMENTS

| | | | |
|---|---|---|---|
| 2001/0026887 A1 | 10/2001 | Minamiura et al. | |
| 2010/0173181 A1* | 7/2010 | Okada | H01M 50/209 429/53 |
| 2011/0117401 A1* | 5/2011 | Lee | H01M 50/30 429/82 |
| 2012/0114993 A1* | 5/2012 | Park | H01M 50/271 429/88 |
| 2012/0288738 A1* | 11/2012 | Yasui | H01M 50/262 429/82 |
| 2014/0205878 A1* | 7/2014 | Ohgitani | H01M 50/358 429/82 |
| 2014/0315070 A1 | 10/2014 | Park et al. | |
| 2014/0322566 A1 | 10/2014 | Kim | |
| 2015/0125720 A1* | 5/2015 | Fujii | H01M 50/209 429/56 |
| 2015/0140405 A1 | 5/2015 | Sakurai | |
| 2015/0188103 A1* | 7/2015 | Minami | H01M 50/40 429/156 |
| 2017/0358785 A1* | 12/2017 | Hattori | H01M 50/264 |
| 2018/0019454 A1* | 1/2018 | Okada | H01M 50/588 |
| 2018/0047959 A1 | 2/2018 | Kruger | |
| 2019/0006650 A1* | 1/2019 | Bryla | H01M 50/383 |
| 2020/0067056 A1* | 2/2020 | Wynn | H01M 50/213 |
| 2020/0152941 A1* | 5/2020 | Wynn | H01M 10/0422 |
| 2020/0243816 A1* | 7/2020 | Terauchi | H01M 50/224 |
| 2021/0104801 A1* | 4/2021 | Chu | H01M 10/6561 |
| 2021/0328281 A1* | 10/2021 | Chu | H01M 10/52 |
| 2022/0052414 A1* | 2/2022 | Huang | H01M 50/383 |

FOREIGN PATENT DOCUMENTS

| | | | | |
|---|---|---|---|---|
| CN | 103311465 A | | 9/2013 | |
| CN | 103943795 A | | 7/2014 | |
| CN | 105027323 | * | 4/2015 | ............. H01M 2/12 |
| CN | 105027323 A | | 11/2015 | |
| CN | 106410090 A | | 2/2017 | |
| CN | 208797082 U | | 4/2019 | |
| CN | 209183604 U | | 7/2019 | |
| CN | 110277533 A | | 9/2019 | |
| CN | 210123787 U | | 3/2020 | |
| CN | 111106278 A | | 5/2020 | |
| EP | 2637235 | * | 2/2013 | ............. H01M 2/10 |
| EP | 3333934 A1 | | 6/2018 | |
| JP | 2012079510 A | | 4/2012 | |
| JP | 2013-114952 | * | 6/2013 | ............. H01M 2/12 |
| JP | 2013114952 A | | 6/2013 | |
| JP | 2015-195137 | * | 11/2015 | ............. H01M 2/10 |
| JP | 2015195137 A | | 11/2015 | |
| WO | 2019174085 A1 | | 9/2019 | |
| WO | 2020135152 A1 | | 7/2020 | |
| WO | WO 2020/133659 | * | 7/2020 | ............. H01M 10/52 |
| WO | WO 2020/215443 | * | 10/2020 | ............. H01M 2/12 |

OTHER PUBLICATIONS

The European Search Report for the European Application No. 20952881.9, dated Nov. 23, 2023, 8pages.
The International search report for PCT Application No. PCT/CN2019/089320, dated Dec. 4, 2019.
Extended European Search Report for European Application No. 19925935.9, dated Aug. 10, 2022.
The First Office Action for the Chinese Application No. 202080102951.3 date Jun. 18, 2024, 9 pages.
The Non Final Rejection for the U.S. Appl. No. 17/504,295 dated May 30, 2024, 19 pages.
The Final Rejection for the U.S. Appl. No. 17/504,295, dated Nov. 6, 2024, 18 pages.
The Notice of Allowance for the CN Application No. 202080102951.3, dated Dec. 13, 2024, 7 pages.

* cited by examiner

Fig. 13

BATTERY, ELECTRIC DEVICE, MANUFACTURING METHOD AND MANUFACTURING SYSTEM FOR BATTERY

CROSS-REFERENCE TO RELATED APPLICATION

This application is a continuation of International Application No. PCT/CN2020/115022, filed on Sep. 14, 2020 and entitled "BATTERY, ELECTRIC DEVICE, MANUFACTURING METHOD AND SYSTEM FOR BATTERY", the entirety of which is incorporated herein by reference.

TECHNICAL FIELD

The present disclosure relates to the technical field of batteries, and in particular, to a battery, an electric device, a manufacturing method and a manufacturing system for the battery.

BACKGROUND

With development of society and science technology, batteries are widely used to provide power for high-power devices, such as electric vehicles and the like. As batteries are widely used in all aspects of human life, the safety requirements for batteries are getting higher and higher. However, the batteries may sometimes undergo thermal runaway during use. Once the thermal runaway occurs in the battery, the battery in its entirety is prone to catching fire quickly and then explode, which seriously affects the use safety of the battery.

SUMMARY

The present disclosure provides a battery, an electric device, a manufacturing method and a manufacturing system for the battery, aiming to solve the technical problem of the use safety of the battery being seriously affected due to the battery being prone to catching fire quickly and then exploding Embodiments of the present disclosure provide a battery, including a battery module, a casing and a flow guide member.

The battery module includes an explosion-proof assembly. The casing is configured to accommodate the battery module. The casing includes a gas discharge passage. The gas discharge passage includes a gas inlet and a gas outlet. The flow guide member is disposed inside the casing and shields the explosion-proof assembly to form a gas guide passage. The gas guide passage is in communication with the gas inlet, guiding gas generated by the battery module to an exterior of the casing through the gas outlet after the explosion-proof assembly is destroyed.

In one embodiment of the present disclosure, the gas guide passage is enclosed and formed by the flow guide member and the battery module, and the explosion-proof assembly is located in the gas guide passage. The gas released from the explosion-proof assembly can directly enter the gas guide passage, and can be guided by the gas guide passage to the gas discharge passage, thereby further reducing the possibility of the gas escaping from the gas guide passage and spreading to the battery module outside the gas guide passage.

In one embodiment of the present disclosure, the flow guide member includes a first plate and a second plate, the first plate shields the explosion-proof assembly, and two or more second plates extend from the first plate toward the battery module, respectively, and the gas guide passage is enclosed and formed by the first plate, the two or more second plates, and the battery module. The first plate and the second plate can effectively block the flow of gas from different directions, respectively, thereby effectively guiding the gas to flow along the gas guide passage and reducing the possibility of the gas spreading freely to the surroundings.

In one embodiment of the present disclosure, the first plate is detachably connected to the casing or the first plate is welded to the casing. When the extent of the damage to the first plate and the second plate of the flow guide member is low due to a region where the thermal runaway occurs in the battery module being small, the flow guide member can be removed from the cover and can be replaced with a new flow guide member, so the cover is not needed to be replaced as a whole.

In one embodiment of the present disclosure, the battery module includes a connecting piece including a gas flow passage, the connecting piece is configured to be connected with the flow guide member, and the gas guide passage is communication with the gas inlet through the gas flow passage. The gas flow passage of the connecting piece can assist in guiding the gas, thereby facilitating reducing the possibility that the gas spreads freely to the surroundings after the gas is discharged from the gas guide passage and before entering the gas discharge passage.

In one embodiment of the present disclosure, the connecting piece and the flow guide member are integrally formed. The connecting piece and the flow guide member may be seamlessly connected, thereby facilitating reducing the possibility of the gas escaping from a gap existing at the connection between the connecting piece and the flow guide member, the gap being caused by the split design of the connecting piece and the flow guide member.

In one embodiment of the present disclosure, the casing includes a cover, the explosion-proof assembly is disposed facing the cover, and the flow guide member is configured to be connected with the cover. When the battery module undergoes thermal runaway and releases gas from the destroyed explosion-proof assembly, the gas will not directly act on the cover due to being blocked by the flow guide member, thereby reducing the possibility of damage to the cover caused by the gas directly impacting the cover.

In one embodiment of the present disclosure, the casing further includes a housing for accommodating the battery module, the housing includes a side plate to which the cover is connected, an accommodating portion is formed at a connection position between the cover and the side plate, the gas discharge passage is disposed on the side plate and the gas inlet is in communication with the accommodating portion, and at least portion of the connecting piece is located within the accommodating portion. The gas guide passage and the gas inlet of the gas discharge passage are in communication with each other in the accommodating portion by the connecting piece, so the gas exchange position of the gas guide passage and the gas inlet of the gas discharge passage is located at the accommodating portion, thereby facilitating reducing the possibility of the gas escaping and directly entering the casing during the exchange process.

In one embodiment of the present disclosure, the housing includes two side plates which are spaced from each other, the battery module is disposed between the two side plates, and the gas guide passage extends from one of the two side plates towards the other of the two side plates. The two side plates are each provided with the gas discharge passage, so the gas generated when the thermal runaway occurs in the battery module can flow to the gas discharge passages on two sides through the gas guide passage, thereby facilitating improving the gas discharging efficiency.

In one embodiment of the present disclosure, a number of the battery module is same as a number of the flow guide member, and one battery module is provided correspondingly with one flow guide member, for guiding gas generated after the explosion-proof assembly of each battery module is destroyed. The means in which one battery module is provided correspondingly with one flow guide member, can effectively separate various battery modules from each other, so the gas generated when the thermal runaway occurs in each battery module is not prone to spreading to other battery modules, improving effectively the safety of the battery.

In one embodiment of the present disclosure, the gas discharge passage further includes a confluence chamber, the gas inlet and the gas outlet are each in communication with the confluence chamber, a number of the gas inlet is equal to a number of the flow guide member, and one gas inlet is in communication with one gas flow passage. After the confluence chamber is provided, the confluence chamber can accommodate more gas, and the pressure will decrease rapidly after the gas enters the confluence chamber, so the gas within the casing can enter the gas discharge passage through the gas inlet more quickly, and then the gas can quickly leave the accommodating space of the casing, thereby further reducing the possibility of a sharp increase in the internal pressure inside the casing due to the inability of the gas to be quickly discharged from the casing.

In one embodiment of the present disclosure, the battery further includes a sealing member configured to seal the gas guide passage such that the gas flows to the gas inlet along the gas guide passage. The provision of the sealing member can reduce the possibility of gas escaping from other positions of the gas guide passage during the process of entering the gas inlet of the gas discharge passage.

In one embodiment of the present disclosure, the sealing member is disposed between the flow guide member and the battery module. On one hand, the possibility can be reduced that the gas cannot be discharged in time due to the gas entering the gap between the battery module and the side plate; on the other hand, the possibility can be reduced that other battery modules catch fire and then explode due to the gas entering the gap between the battery module and the side plate and spreading to the other battery modules through the gap.

And/or, the sealing member is disposed between the battery module and the side plate, thereby reducing the possibility of the gas escaping from the gap between the flow guide member and the battery module during the process of the gas entering the gas inlet of the gas discharge passage.

In one embodiment of the present disclosure, the battery also includes a pressure relief valve, the pressure relief valve is disposed on an outer wall of the casing and covers the gas outlet, the pressure relief valve is configured to be actuated to relieve pressure when pressure or temperature within the gas discharge passage reaches a threshold value, thereby ensuring that the gas can be timely and quickly discharged to the external environment through the pressure relief valve.

The battery according to the embodiments of the present disclosure includes the casing, the battery module, and the flow guide member. The battery module and the flow guide member are both disposed inside the casing. The battery module includes an explosion-proof assembly. When the thermal runaway occurs in the battery module, the explosion-proof assembly will be destroyed, and the battery module can release the gas through the destroyed explosion-proof assembly. The flow guide member shields the explosion-proof assembly of the battery module to form the gas guide passage. The gas guide passage can guide the gas to flow toward the gas discharge passage along a predetermined path. Then, the gas will be quickly discharged out of the casing through the gas discharge passage. In this way, the provision of the gas guide passage and the gas discharge passage can reduce the possibility that other battery modules that have not undergone thermal runaway catch fire and then explode due to the gas released by the battery module that has undergone thermal runaway spreading freely to the surroundings, thereby improving the use safety of the battery.

An embodiment of the present disclosure also provides an electric device, including the battery as in the above-mentioned embodiment, and the battery is configured to provide electrical energy.

An embodiment of the present disclosure also provides a manufacturing method of a battery, including:

disposing a battery module including an explosion-proof assembly inside a casing including a gas discharge passage, the gas discharge passage including a gas inlet and a gas outlet; and     disposing a flow guide member inside the casing and shielding the explosion-proof assembly to form a gas guide passage, the gas guide passage being in communication with the gas inlet, for guiding gas generated by the battery module to an exterior of the casing through the gas outlet after the explosion-proof assembly is destroyed.

In the battery processed and manufactured by the manufacturing method of the battery according to the embodiment of the present disclosure, the flow guide member shields the explosion-proof assembly of the battery module. The gas guide passage and the gas discharge passage can guide the gas to flow along a predetermined path. In this way, the provision of the gas guide passage and the gas discharge passage can reduce the possibility that other battery modules that have not undergone thermal runaway catch fire and then explode due to the gas released by the battery module that has undergone thermal runaway spreading freely to the surroundings, thereby improving the use safety of the battery.

An embodiment of the present disclosure also provides a manufacturing system of a battery, including:

a first assembling device configured to dispose a battery module including an explosion-proof assembly inside a casing including a gas discharge passage, the gas discharge passage including a gas inlet and a gas outlet; and     a second assembling device configured to dispose a flow guide member inside the casing and shielding the explosion-proof assembly to form a gas guide passage, the gas guide passage being in communication with the gas inlet, for guiding gas generated by the battery module to an exterior of the casing through the gas outlet after the explosion-proof assembly is destroyed.

BRIEF DESCRIPTION OF THE DRAWINGS

In order to illustrate the technical solution of embodiments of the present disclosure more explicitly, the accompanying drawings that need to be used in the embodiments of the present disclosure will be briefly illustrated below. Apparently, the accompanying drawings described below are only used to illustrate some embodiments of the present disclosure, and other drawings can also be obtained by the ordinary person skilled in the art according to the accompanying drawings without any creative effort.

DETAILED DESCRIPTION

The implementations of the present disclosure will be described in further detail below in conjunction with the accompanying drawings and embodiments. The detailed description of the following embodiments and drawings are used to exemplarily illustrate the principle of the present disclosure, rather than used to limit the scope of the present disclosure. That is, the present disclosure is not limited to the described embodiments.

In the description of the present disclosure, it should be stated, unless otherwise specified, "a plurality of" refers to two or more; and the directions or positional relationships indicated by the terms such as "upper", "lower", "left", "right", "inner", "outside" and the like, are only for the convenience of describing the present disclosure and simplifying the description, and do not mean or imply that the involved device or element must have a specific orientation or must be configured or operated in the specific orientation, therefore, they cannot be understood as limiting the present disclosure. In addition, the terms "first", "second", "third" and the like are only used for descriptive purposes, and should not be interpreted as indicating or implying relative importance. The term "perpendicular" need not be strictly perpendicular, but allows for an allowable amount of error. The term "parallel" need not be strictly parallel, but allows for an allowable amount of error.

The orientation terms appearing in the following description refer to the directions shown in the drawings, and are not intended to limit the specific structure of the present disclosure. In the description of the present disclosure, it should also be stated, unless otherwise specified and limited, the terms "mounted", "connected to", "connected with" or the like should be understood in a broad sense. For example, a connection may refer to a fixed connection or a disassembly connection; or may refer to an integral connection; or may refer to a direct connection or an indirect connection through an intermediate medium. For the ordinary person skilled in the art, the specific meanings of the above terms in the present disclosure may be understood according to specific situations.

After considering the problem that the battery in its entirety will quickly catch fire and then explode once a thermal runaway occurs in the battery, the applicant has conducted research and analysis on the various structures and use environments of the battery. The applicant found, when a thermal runaway occurs in one battery module of the battery, other battery modules that have not undergone thermal runaway are often quickly affected, resulting in the fire and then explosion of other battery modules that have not undergone thermal runaway in a very short period of time, and eventually resulting in the fire and then explosion of the battery in its entirety. In order to avoid the explosion of the entire battery caused by the thermal runaway of one battery module, the applicant carried out cooling process on the battery module that is undergoing thermal runaway, but the applicant found that the temperature of the battery module after undergoing the thermal runaway rose rapidly, and it was difficult to suppress the spread of thermal runaway only by cooling process. The applicant found that the key to suppressing the spread of thermal runaway is to discharge the high-temperature gas accumulated in the battery in time after the thermal runaway of the battery module is found, so as to quickly reduce the temperature of the battery and prevent the spread of thermal runaway.

In view of the above problems found by the applicant, the applicant has improved the structure of the battery, and the embodiments of the present disclosure will be further described below.

In order to better understand the present disclosure, the embodiments of the present disclosure are described below in conjunction with FIG. 1 to FIG. 13.

Figure 1:
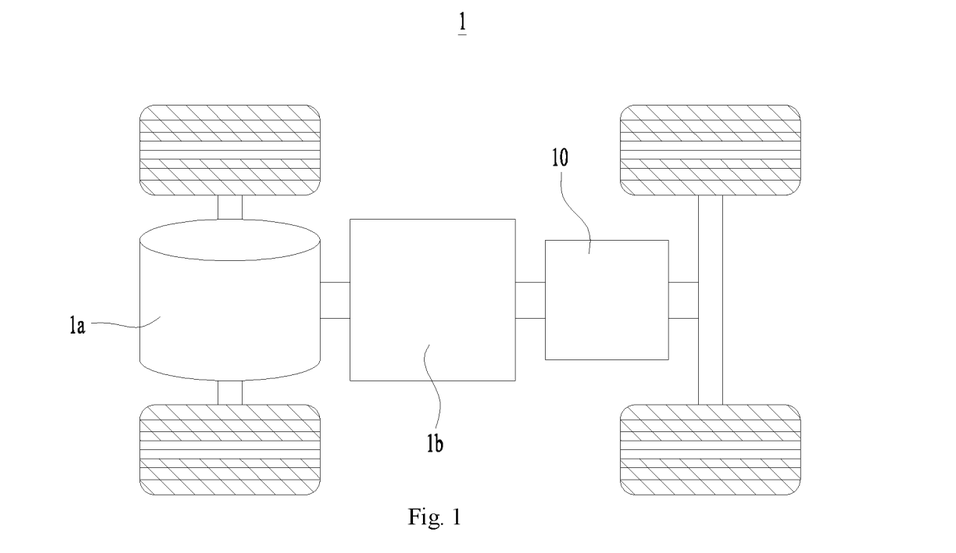
FIG. 1 is a structural schematic diagram of a vehicle according to an embodiment of the present disclosure.

An embodiment of the present disclosure provides an electric device using the battery 10 as a power source. The electric device can be, but not limited to, a vehicle, a ship, an aircraft, or the like. Referring to FIG. 1, the embodiment of the present disclosure provides a vehicle 1. The vehicle 1 may be a fuel vehicle, a gas vehicle, a new energy vehicle, or the like. The new energy vehicle may be a pure electric vehicle, a hybrid vehicle, an extended-range vehicle, or the like. In the embodiment of the present disclosure, the vehicle 1 may include a motor 1a, a controller 1b and a battery 10. The controller 1b is configured to control the battery 10 to supply power to the motor 1a. The motor 1a is connected to the wheels through a transmission mechanism, thereby driving the vehicle 1 to travel. The battery 10 may be used as a driving power source of the vehicle 1 to provide driving power for the vehicle 1 in place of or partially in place of fuel or natural gas. In an example, the battery 10 may be provided at the bottom, front or rear of the vehicle 1. The battery 10 may be configured to power the vehicle 1. In an example, the battery 10 may be used as an operating power source of the vehicle 1 for the electrical circuit system of the vehicle 1. Optionally, the battery 10 may be configured to satisfy the operating power requirements of the vehicle 1 when starting, navigating and running.

Figure 2:
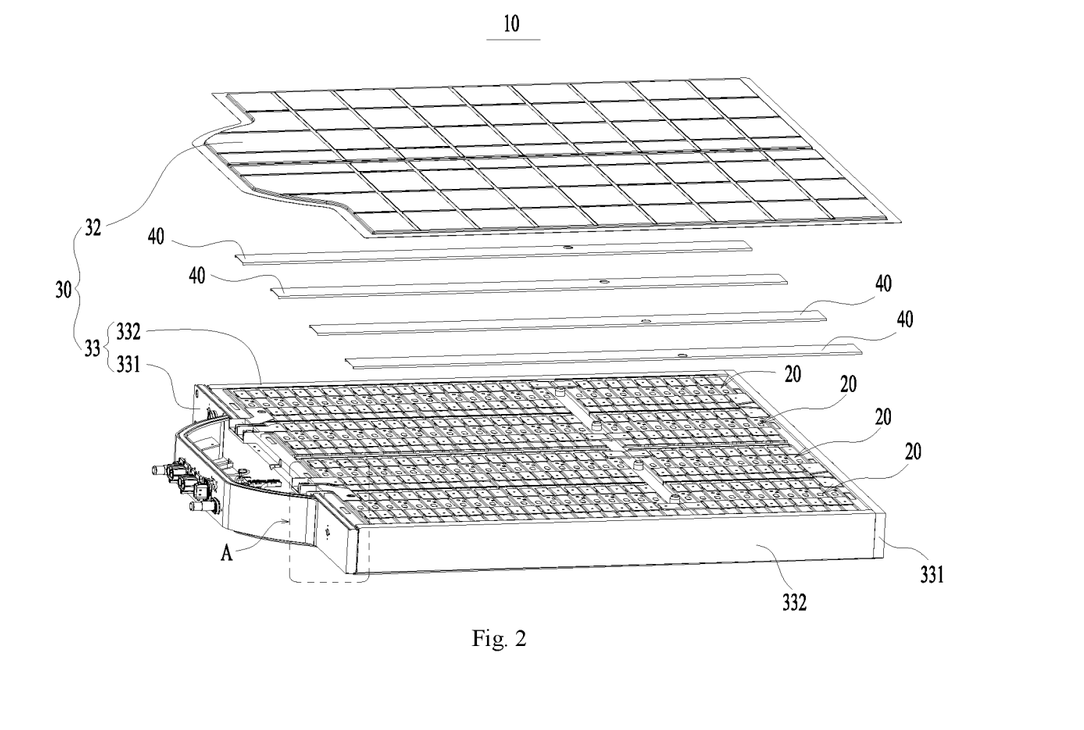
FIG. 2 is a schematic diagram of an exploded structure of a battery according to an embodiment of the present disclosure.

Referring to FIG. 2, the battery 10 may include two or more battery modules 20. In some optional embodiments, the battery 10 further includes a casing 30. The casing 30 includes an accommodating space. The battery module 20 is disposed within the accommodating space of the casing 30. The casing 30 may provide a mounting platform for the battery module 20, and may also provide protection for the battery module 20. The two or more battery modules 20 are arranged inside the casing 30. The two or more battery modules 20 may be arranged side by side along one direction, so as to make full use of the accommodating space of the casing 30.

Referring to FIG. 2, the battery 10 further includes a guide member 40. The flow guide member 40 is arranged inside the casing 30. The flow guide member 40 is disposed corresponding to the battery module 20. The number of the flow guide members 40 may be equal to the number of the battery modules 20, that is, one flow guide member 40 is corresponding to one battery module 20. The flow guide member 40 and the casing 30 are of split structures, namely, they are disposed separately from each other, so they are independently processed and manufactured and are then assembled together.

Figure 3:
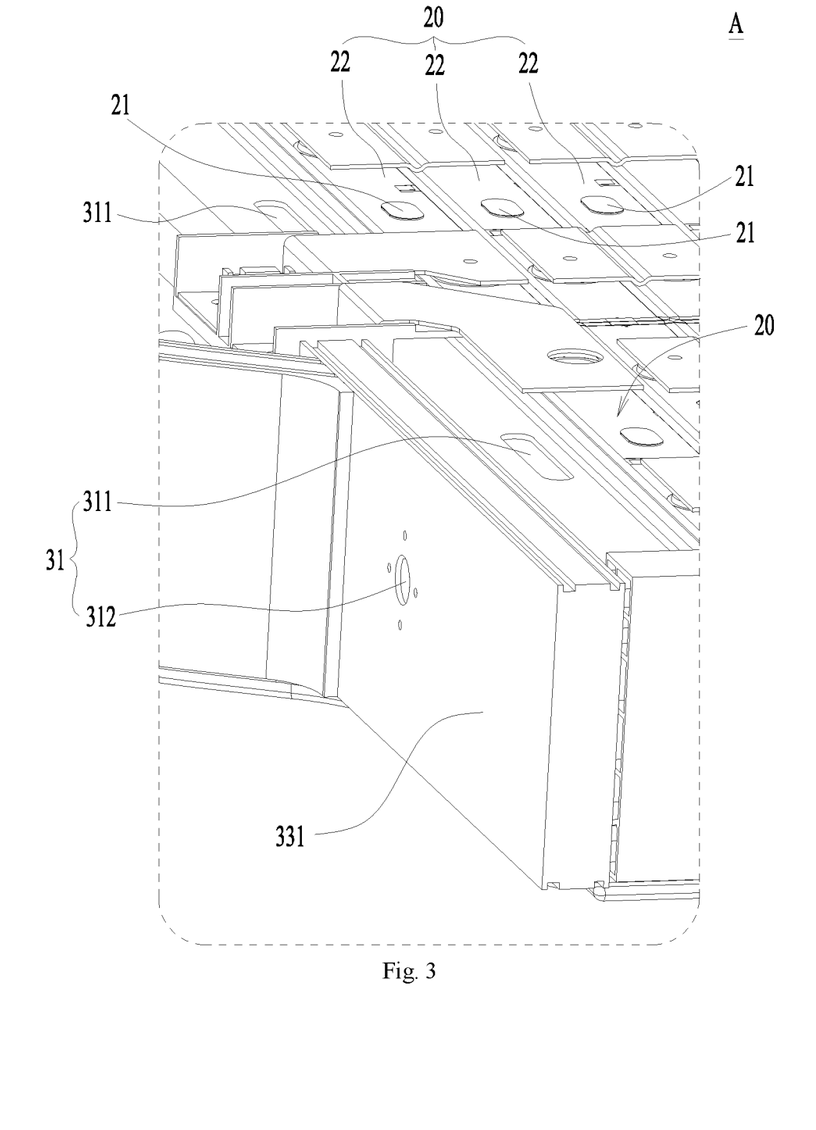
FIG. 3 is an enlarged view at A portion shown in FIG. 2.

Referring to FIG. 3, the battery module 20 may include two or more battery cells 22, but the number of the battery cells 22 included in the battery module 20 is not limited here. In each battery module 20, the two or more battery cells 22 may be connected in series, in parallel or in a mixed manner. The two or more battery cells 22 may be arranged side by side along one direction. The arrangement direction of the two or more battery cells 22 may be perpendicular to the arrangement direction of various battery modules 20.

Referring to FIG. 3, the battery module 20 includes an explosion-proof assembly 21. In the embodiment where the battery module 20 includes the two or more battery cells 22, the explosion-proof assembly 21 may be an explosion-proof valve disposed on each battery cell 22. When the internal pressure inside the battery cell 22 is too excessive, the explosion-proof valve will be destroyed, so the gas inside the battery cell 22 will be released through the destroyed explosion-proof valve. The gas released from the battery cell 22 is in a high-temperature and high-pressure state. In some other embodiments, the battery module 20 has an outer housing (not shown in the figure) and an explosion-proof valve disposed on the outer housing. The two or more battery cells 22 are arranged inside the outer housing. The explosion-proof assembly 21 may be an explosion-proof valve provided on the outer housing. When the internal pressure inside the battery cell 22 is too excessive, the gas will be released from the battery cell 22 into the inner space inside the outer housing. When the pressure inside the outer housing reaches a preset pressure value, the explosion-proof valve on the outer housing will be destroyed, and the gas inside the outer housing will be released through the destroyed explosion-proof valve. The gas released from the outer housing is in a high-temperature and high-pressure state.

Referring to FIG. 2 and FIG. 3, the casing 30 includes a gas discharge passage 31. The gas discharge passage 31 includes a gas inlet 311 and a gas outlet 312. The gas discharge passage 31 is in communication with the accommodating space inside the casing 30 through the gas inlet 311. The gas discharge passage 31 is in communication with an external environment through the gas outlet 312. The gas discharge passage 31 functions to guide the flow of gas. When the battery module 20 undergoes thermal runaway and releases high-temperature and high-pressure gas, the gas may enter the gas discharge passage 31 from the gas inlet 311 of the gas discharge passage 31, and finally may be directionally discharged from the gas outlet 312 to the external environment by means of the guidance of the gas discharge passage 31, thereby reducing the possibility of explosion of the battery 10 due to the accumulation of a large amount of gas released by the thermal runaway of the battery module 20.

Figure 4:
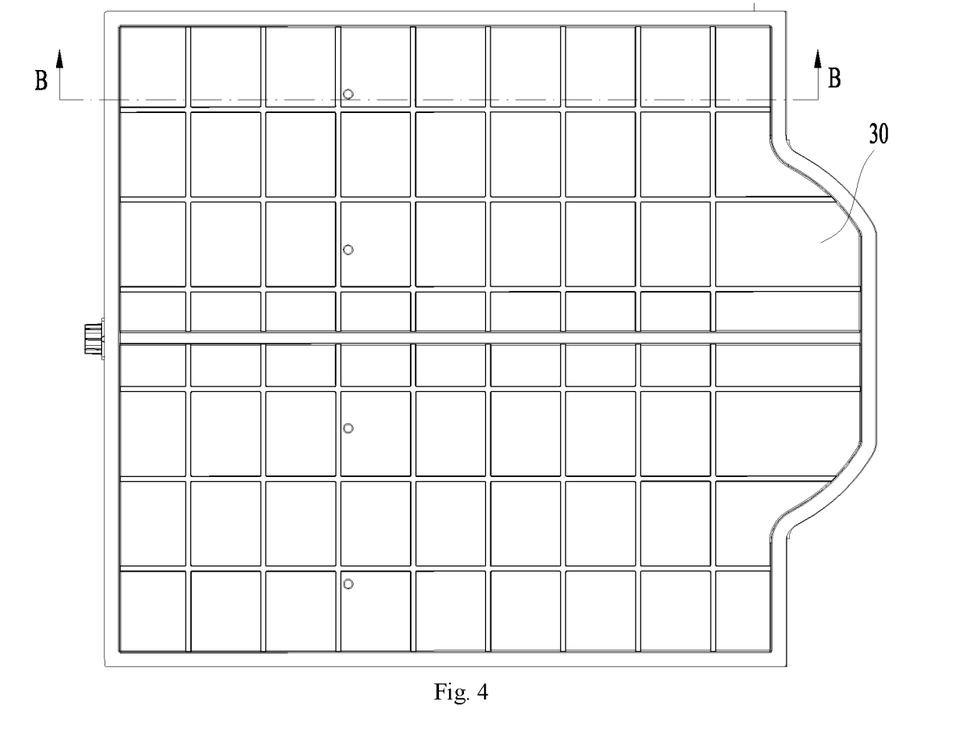
FIG. 4 is a structural schematic diagram of a battery according to an embodiment of the present disclosure.
Figure 5:
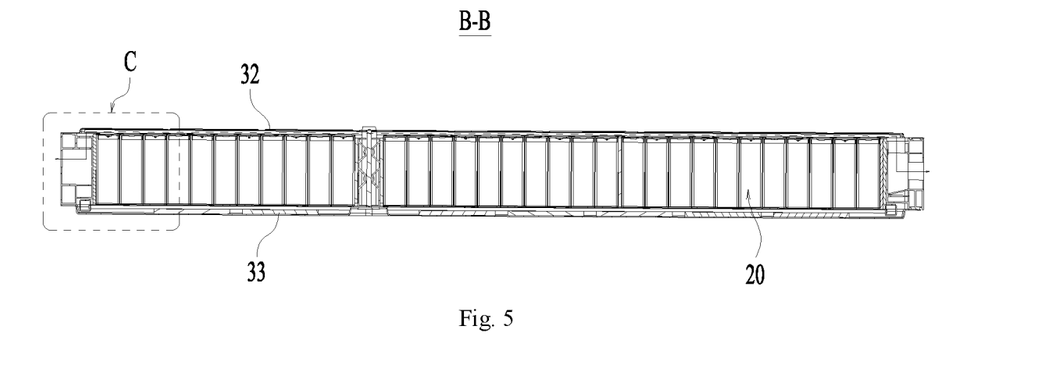
FIG. 5 is a schematic diagram of a cross-sectional structure taken along B-B direction shown in FIG. 4.
Figure 6:
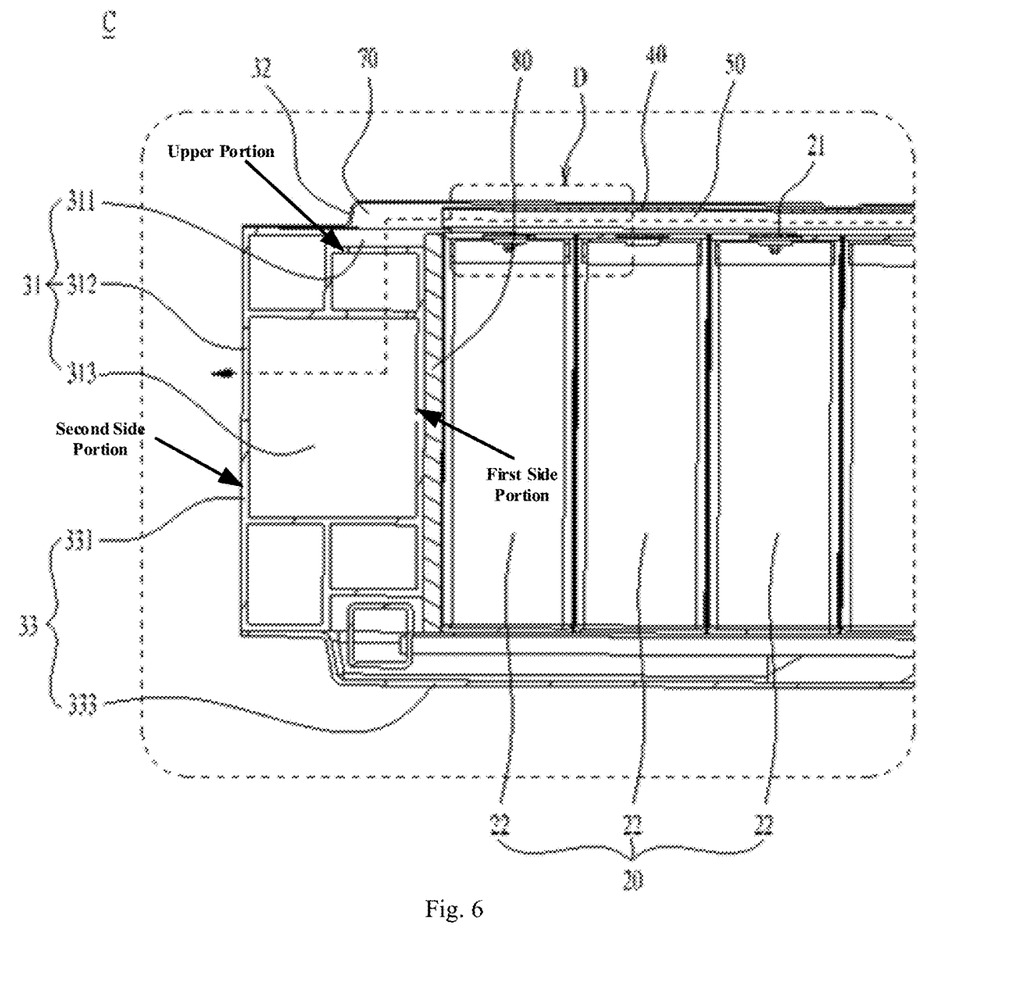
FIG. 6 is an enlarged view at C portion shown in FIG. 5.

Referring to FIG. 4 to FIG. 6, a flow guide member 40 is disposed inside the casing 30 and shields the explosion-proof assembly 21 to form a gas guide passage 50. The explosion-proof assembly 21 is disposed corresponding to the gas guide passage 50. The gas guide passage 50 is in communication with the gas inlet 311 of the gas discharge passage 31. The gas guide passage 50 is configured to guide the gas generated by the battery module 20 after the explosion-proof assembly 21 is destroyed, to the gas discharge passage 31, and guide the gas to the outside of the casing 30 through the gas outlet 312 of the gas discharge passage 31, so the gas inside battery 10 can be quickly discharged and depressurized, thereby preventing the spread of thermal runaway and reducing the possibility of explosion. Since the flow guide member 40 shields the explosion-proof assembly 21, the flow guide member 40 can isolate the explosion-proof assembly 21 from the casing 30, so the gas released after the explosion-proof assembly 21 is destroyed will be blocked by the flow guide member 40, reducing the possibility that the casing 30 is rapidly melted due to the gas directly impacting on the casing 30. Along the arrangement direction of the battery cells 22, the battery module 20 has two opposite ends. The gas discharge passage 31 is disposed in a region of the casing 30 corresponding to one end of the battery module 20. It can be understood that the regions of casing 30 corresponding to the both ends of the battery module 20 are provided with gas discharge passages 31, respectively, so the gas can be discharged in two directions, thereby facilitating improving the efficiency of discharging gas from the casing 30. The extending direction of the flow guide member 40 is the same as the arrangement direction of the battery cells 22.

The battery 10 according to the embodiment of the present disclosure includes the casing 30, the battery modules 20, and the flow guide member 40. The battery modules 20 and the flow guide member 40 are disposed inside the casing 30. The battery module 20 includes the explosion-proof assembly 21. When the thermal runaway occurs in the battery module 20, the explosion-proof assembly 21 can be destroyed, so the battery module 20 can release internal gas through the destroyed explosion-proof assembly 21. The flow guide member 40 shields the explosion-proof assembly 21 of the battery module 20 to form the gas guide passage 50. The gas guide passage 50 can guide the gas to flow toward the gas discharge passage 31 along a predetermined path. Then, the gas will be quickly discharged from the casing 30 through the gas discharge passage 31. The gas guide passage 50 and the gas discharge passage 31 can be provided to guide the directional flow of the gas. In this way, the possibility can be reduced that other battery modules 20 that have not undergone thermal runaway catch fire and then explode due to the gas released by the battery module 20 that has undergone thermal runaway spreading freely to the surroundings, thereby improving the use safety of the battery 10.

In some embodiments, as shown in FIG. 5 and FIG. 6, the gas guide passage 50 is enclosed and formed by the flow guide member 40 and the battery modules 20, and the explosion-proof assembly 21 may be disposed in the gas guide passage 50. Therefore, when a thermal runaway occurs, the gas released from the explosion-proof assembly 21 can directly enter the gas guide passage 50, and can be guided by the gas guide passage 50 to the gas discharge passage 31, thereby further reducing the possibility of the gas escaping from the gas guide passage 50 and spreading to the battery module 20 outside the gas guide passage 50, and improving the gas discharging efficiency.

Figure 7:
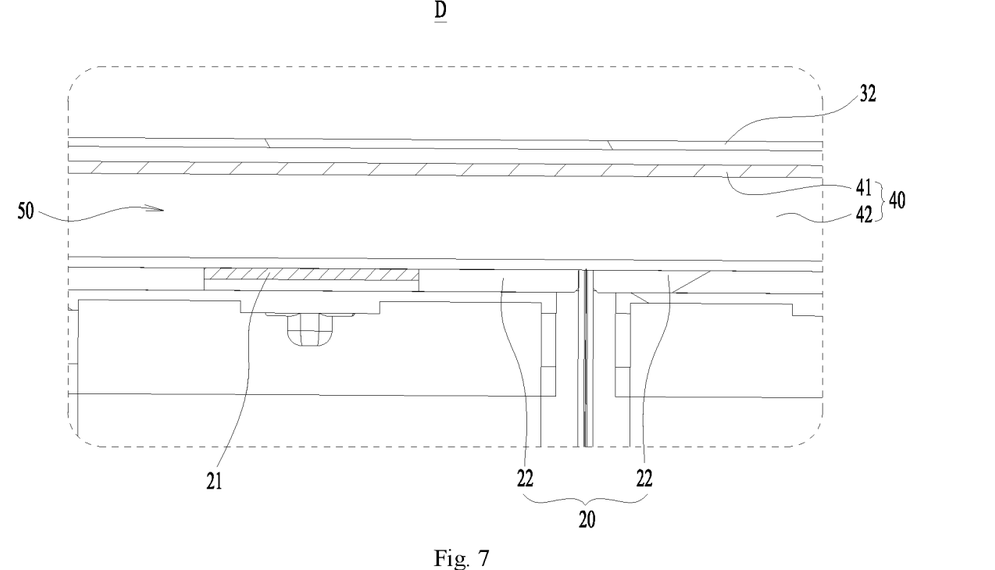
FIG. 7 is an enlarged view at D portion shown in FIG. 6.
Figure 8:
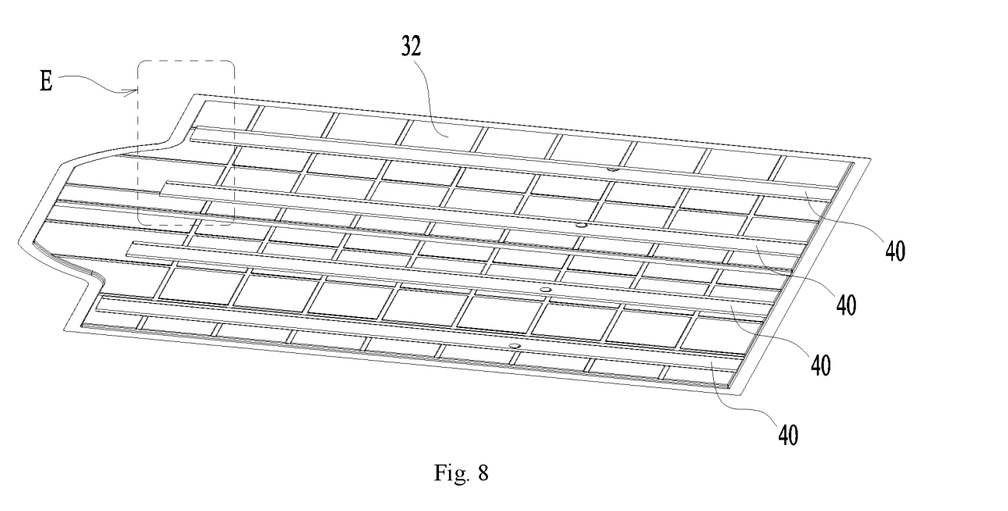
FIG. 8 is a schematic diagram of a partial structure of a battery according to an embodiment of the present disclosure.
Figure 9:
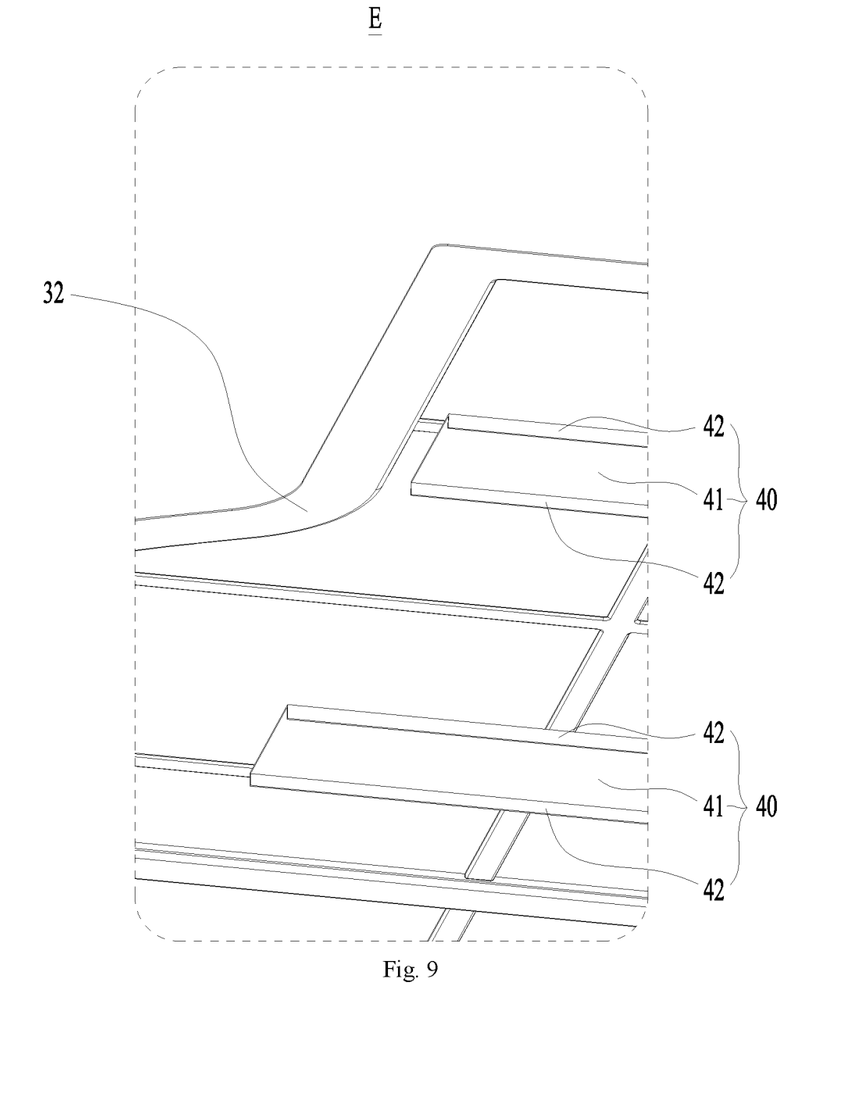
FIG. 9 is an enlarged view at E portion shown in FIG. 8.

In some embodiments, as shown in FIG. 7, the flow guide member 40 includes a first plate 41 and a second plate 42. The first plate 41 is configured to shield the explosion-proof assembly 21 to isolate the explosion-proof assembly 21 from the casing 30. The second plate 42 extends from the first plate 41 toward the battery module 20. The gas guide passage 50 is enclosed and formed by the first plate 41, the second plate 42 and the battery module 20. The first plate 41 can block the gas from the front of the explosion-proof assembly 21 of the battery module 20, and the second plate 42 can block the gas from the side of the explosion-proof assembly 21. Therefore, the first plate 41 and the second plate 42 can effectively block the flow of the gas from different directions, respectively, thereby effectively guiding the gas to flow along the gas guide passage 50, reducing the possibility of the spread of the gas freely to the surroundings, and improving the gas discharging efficiency. In an example, as shown in FIG. 7 to FIG. 9, the flow guide member 40 includes the first plate 41 and two second plates 42. Along the arrangement direction of the battery modules 20, the two second plates 42 are spaced from each other, the two second plates 42 are disposed on the same side of the first plate 41, and the flow guide member 40 has a U-shaped structure as a whole. A chamber formed by the first plate 41 and the two second plates 42 can form the gas guide passage 50 together with the battery module 20. In an example, the first plate 41 and the second plates 42 are integrally formed. It can be understood that the number of the second plates 42 may also be three or more. Along the arrangement direction of the battery modules 20, the three or more second plates 42 are spaced from each other. The two adjacent second plates 42 and a portion of the first plate 41 forms one chamber. Two or more chambers may form the gas guide passage 50 together with the battery module 20.

Figure 10:
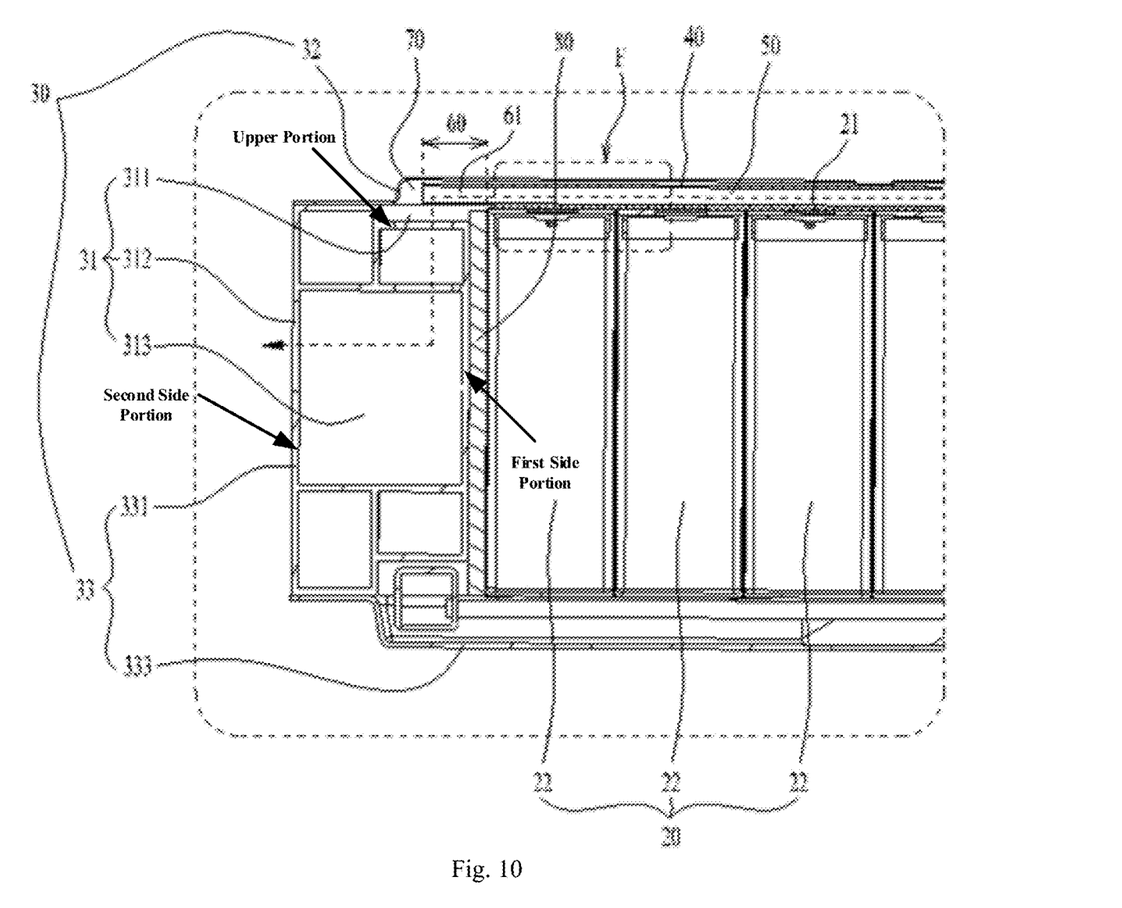
FIG. 10 is a schematic diagram of a partial cross-sectional structure of a battery according to an embodiment of the present disclosure.

In some embodiments, as shown in FIG. 10, the gas inlet 311 of the gas discharge passage 31 in the casing 30 is located on one side of the battery module 20, and the gas guide passage 50 extends to the end of the battery module 20. Therefore, a distance is formed between the gas guide passage 50 and the gas inlet 311 of the gas discharge passage 31. The battery module 20 further includes a connecting piece 60. The connecting piece 60 includes a gas flow passage 61 for guiding the flow of gas. The connecting piece 60 is configured to be connected to the flow guide member 40. Therefore, the gas flowing out from the gas guide passage 50 can directly enter the gas flow passage 61 of the connecting piece 60. The gas guide passage 50 is in communication with the gas inlet 311 of the gas discharge passage 31 through the gas flow passage 61 of the connecting piece 60. During the process of gas flowing from the gas guide passage 50 into the gas discharge passage 31, the gas flow passage 61 of the connecting piece 60 can assist in guiding the gas, thereby facilitating reducing the possibility that the gas spreads freely to the surroundings after the gas is discharged from the gas guide passage 50 and before entering the gas discharge passage 31.

In an example, the connecting piece 60 and the flow guide member 40 are integrally formed. Therefore, the connecting piece 60 and the flow guide member 40 may be seamlessly connected, thereby reducing the possibility of the gas escaping from a gap existing at the connection between the connecting piece 60 and the flow guide member 40, the gap being caused by the split design of the connecting piece 60 and the flow guide member 40. The connecting piece 60 may have the same cross-sectional shape as the flow guide member 40. Alternatively, the connecting piece 60 may also have a cylindrical structure. Therefore, the gas flowing out from the gas guide passage 50 can directly enter the gas flow passage 61 of the connecting piece 60, and then enter the gas discharge passage 31 under the guidance of the gas flow passage 61, thereby reducing the possibility that the gas will spread freely to the surroundings after the gas is discharged from the gas guide passage 50 before entering the gas discharge passage 31.

In some embodiments, as shown in FIG. 10, the casing 30 includes a cover 32. The explosion-proof assembly 21 of the battery module 20 is disposed facing the cover 32. The flow guide member 40 is configured to be connected to the cover 32. The flow guide member 40 is disposed between the cover 32 and the battery module 20. When the battery module 20 undergoes thermal runaway and releases gas from the destroyed explosion-proof assembly 21, the gas will not directly act on the cover 32 due to being blocked by the flow guide member 40, thereby reducing the possibility of damage to the cover 32 caused by the gas directly impacting the cover 32. For example, if the battery 10 is applied to the vehicle 1, the cover 32 of the casing 30 faces the passenger compartment. If the cover 32 of the casing 30 is damaged, the gas may quickly enter the passenger compartment to cause injury to the passengers within the vehicle. The battery module 20 of the present embodiment can reduce the possibility of damage to the cover 32 by providing the flow guide member 40, thereby reducing the possibility of gas rapidly invading the passenger compartment through the damaged cover 32 to cause injury to the passengers, and leaving more time for occupants to get out of vehicle 1.

In some embodiments, as shown in FIG. 10, the casing 30 further includes a housing 33. The housing 33 is configured to accommodate the battery modules 20. The housing 33 includes a side plate 331. The cover 32 is connected to the side plate 331. The cover 32 may be connected to the side plate 331 by fasteners and may be sealingly connected with the side plate 331. An accommodating portion 70 is formed at the connection position of the cover 32 and the side plate 331. The accommodating portion 70 has an opening facing the flow guide member 40. The gas discharge passage 31 is provided on the side plate 331, and the gas inlet 311 is in communication with the accommodating portion 70. The gas outlet 312 of the gas discharge passage 31 is located on the surface of the side plate 331 on the side away from the battery module 20. At least portion of the connecting piece 60 is located inside the accommodating portion 70. The gas flow passage 61 of the connecting piece 60 is in communication with the gas inlet 311 of the gas discharge passage 31. In this way, the connecting piece 60 located in the accommodating portion communicates the gas guide passage 50 with the gas inlet 311 of the gas discharge passage 31. Therefore, the gas exchange position of the gas guide passage 50 and the gas inlet 311 of the gas discharge passage 31 is located at the accommodating portion 70, thereby reducing the possibility of the gas escaping and directly entering the casing 30 during the exchange process. In an example, the surface of the side plate 331 connected to the cover 32 is flat, and the cover 32 has a flange connected with the side plate 331 and a concave portion recessed away from the battery module 20. The flow guide member 40 and the connecting piece 60 are located in the concave portion of the cover 32. After the cover 32 and the side plate 331 are connected, the accommodating portion 70 is formed between the concave portion of the cover 32 and the surface of the side plate 331 connected to the cover 32. In this embodiment, as shown in FIG. 6 and FIG. 10, the side plate 331 includes an upper portion, a first side portion, and a second side portion, the first side portion and the second side portion are each connected to the upper portion and are spaced apart from each other in a thickness direction of the side plate 331, the second side portion is disposed away from the battery module 20 relative to the first side portion, the gas inlet 311 of the gas discharge passage 31 is disposed to penetrate the upper portion, and the gas outlet 312 of the gas discharge passage 31 is disposed to penetrate the second side portion. The accommodating portion 70 is formed above the gas inlet 311 of the gas discharge passage 31 and communicates the gas guide passage 50 with the gas inlet 311 of the gas discharge passage 31 such that a gas exchange between the gas guide passage 50 and the gas inlet 311 of the gas discharge passage 31 occurs at the accommodating portion 70.

In some embodiments, as shown in FIG. 10, the housing 33 further includes a support plate 333. The side plate 331 and the support plate 333 are connected with each other. The battery modules 20 are disposed on the support plate 333.

In some embodiments, as shown in FIG. 10, the gas discharge passage 31 further includes a confluence chamber 313. Both the gas inlet 311 of the gas discharge passage 31 and the gas outlet 312 of the gas discharge passage 31 are in communication with the confluence chamber 313. The number of the gas inlets 311 is the same as the number of the flow guide members 40. The number of the connecting pieces 60 is the same as the number of the flow guide members 40. One gas inlet 311 is in communication with one gas flow passage 61 of the connecting piece 60. When thermal runaway occurs in the battery module 20, the gas generated by the battery module 20 is confluent to the confluence chamber 313 through the corresponding gas inlet 311, and then discharged from the gas outlet 312. After the confluence chamber 313 is provided, the confluence chamber 313 can accommodate more gas, and the pressure will decrease rapidly after the gas enters the confluence chamber 313, so the gas within the casing 30 can enter the gas discharge passage 31 through the gas inlet 311 more quickly, and then the gas can quickly leave the accommodating space of the casing 30, thereby further reducing the possibility of a sharp increase in the internal pressure inside the casing 30 due to the inability of the gas to be quickly discharged from the casing 30.

Figure 11:
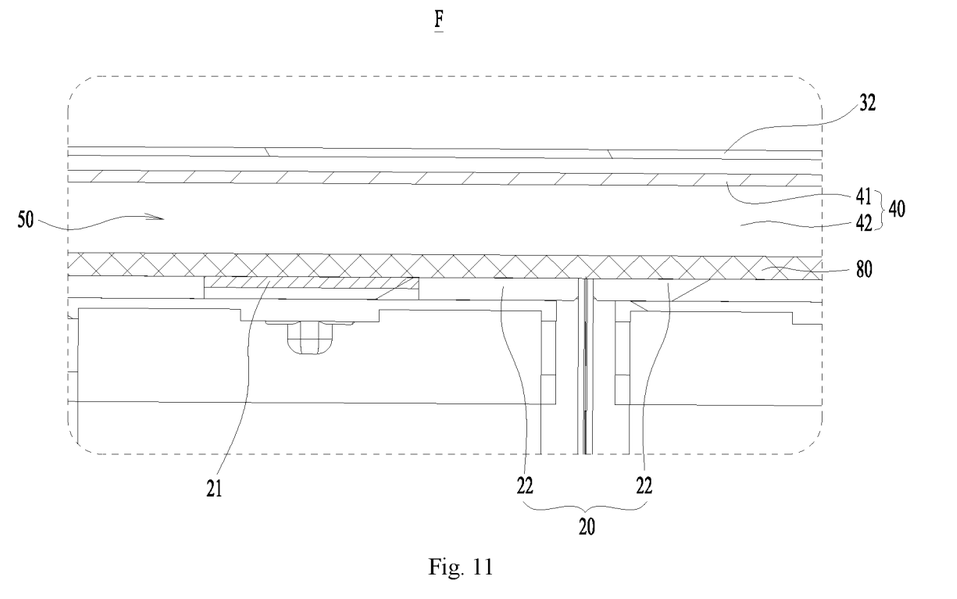
FIG. 11 is an enlarged view at F portion shown in FIG. 10.

In some embodiments, as shown in FIG. 10 and FIG. 11, the flow guide member 40 and the casing 30 may be detachably connected or connected by welding. The flow guide member 40 includes the first plate 41 and the second plate 42. The first plate 41 is detachably connected to the cover 32. For example, the first plate 41 may be connected to the cover 32 by screws or rivets. In this way, when the extent of the damage to the first plate 41 and the second plate 42 of the flow guide member 40 is low due to a region where the thermal runaway occurs in the battery module 20 being small, the flow guide member 40 can be removed from the cover 32 and can be replaced with a new flow guide member 40, so the cover 32 is not needed to be replaced as a whole. Alternatively, the first plate 41 is welded to the cover 32. For example, the first plate 41 may be connected to the cover 32 by laser welding. In this way, the first plate 41 is directly welded to the cover 32, making the structure formed by the first plate 41 and the cover 32 more compact, thereby reducing the space occupancy rate and improving the energy density of the battery 10.

In some embodiments, as shown in FIG. 10 and FIG. 11, the battery 10 further includes a sealing member 80. The sealing member 80 is configured to seal the gas guide passage 50, such that all the gas can flow to the gas inlet 311 of the gas discharge passage 31 along the gas guide passage 50. The gas guide passage 50 has an outlet corresponding to the gas inlet 311 of the gas discharge passage 31. The sealing member 80 is configured to seal the region of the gas guide passage 50 except the outlet. The provision of the sealing member 80 can reduce the possibility of gas escaping from other positions of the gas guide passage 50 during the process of entering the gas inlet 311 of the gas discharge passage 31. The material of the sealing member 80 is selected from high-temperature resistant and impact resistant materials. The sealing member 80 may have a sheet-like structure. In an example, as shown in FIG. 10, the sealing member 80 is disposed between the battery module 20 and the side plate 331. On one hand, the possibility can be reduced that the gas cannot be discharged in time due to the gas entering the gap between the battery module 20 and the side plate 331. On the other hand, the possibility can be reduced that other battery modules 20 catch fire and then explode due to the gas entering the gap between the battery module 20 and the side plate 331 and spreading to the other battery modules 20 through the gap. In another example, as shown in FIG. 11, the sealing member 80 is disposed between the flow guide member 40 and the battery module 20, to reduce the possibility of the gas escaping from the gap between the flow guide member 40 and the battery module 20 during the process of the gas entering the gas inlet 311 of the gas discharge passage 31. For example, the flow guide member 40 includes the first plate 41 and the second plate 42. The first plate 41 is configured to shield the explosion-proof assembly 21 to isolate the explosion-proof assembly 21 from the casing 30. The second plate 42 extends from the first plate 41 toward the battery module 20. The gas guide passage 50 is enclosed and formed by the first plate 41, the second plate 42 and the battery module 20. The sealing member 80 is disposed between the second plate 42 and the battery module 20.

Figure 12:
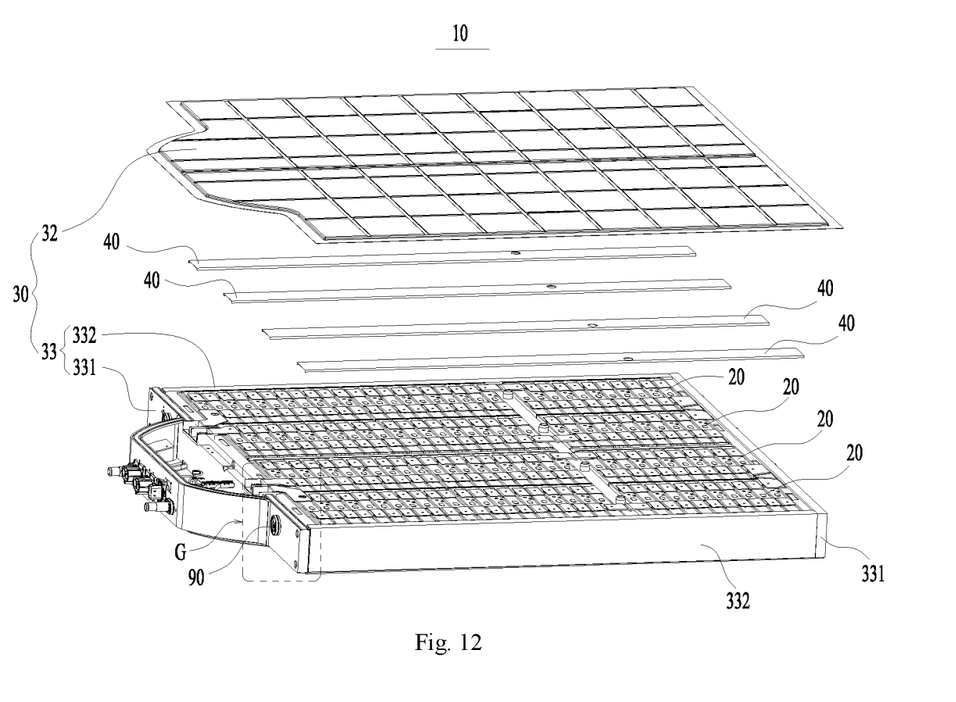
FIG. 12 is a schematic diagram of an exploded structure of a battery according to another embodiment of the present disclosure.

In some embodiments, as shown in FIG. 12, the housing 33 includes two side plates 331 which are spaced from each other and a connecting plate 332. The two side plates 331 are spaced from each other along the arrangement direction of the battery cells 22. The connecting plate 332 is configured to connect the two side plates 331. The battery modules 20 are disposed between the two side plates 331. The gas guide passage 50 extends from one side plate 331 toward the other side plate 331. The gas guide passage 50 has two opposite outlets. The two side plates 331 are each provided with the gas discharge passage 31. The two outlets of the gas guide passage 50 correspond to the gas discharge passages 31 on the two side plates 331, respectively. The gas generated when the thermal runaway occurs in the battery module 20 can flow to the gas discharge passages 31 on two sides through the two outlets of the gas guide passage 50, thereby facilitating improving the gas discharging efficiency, and reducing the possibility that the gas is accumulated in the casing 30 for a long period to cause other battery modules 20 to explode due to the gas spreading to the other battery modules 20 or to cause battery 10 in its entirety to explode due to the rapid rise in pressure instantaneously. In an example, as shown in FIG. 11 and FIG. 12, the number of the battery modules 20 is the same as the number of the flow guide members 40, and one battery module 20 is provided correspondingly with one flow guide member 40. One flow guide member 40 and one battery module 20 form one gas guide passage 50. One flow guide member 40 is configured to independently guide the gas generated after the explosion-proof assembly 21 of one battery module 20 is destroyed. The means in which one battery module 20 is provided correspondingly with one flow guide member 40, can effectively separate various battery modules 20 from each other, so the gas generated when the thermal runaway occurs in each battery module 20 is not prone to spreading to other battery modules 20, improving effectively the safety of the battery 10.

Figure 13:
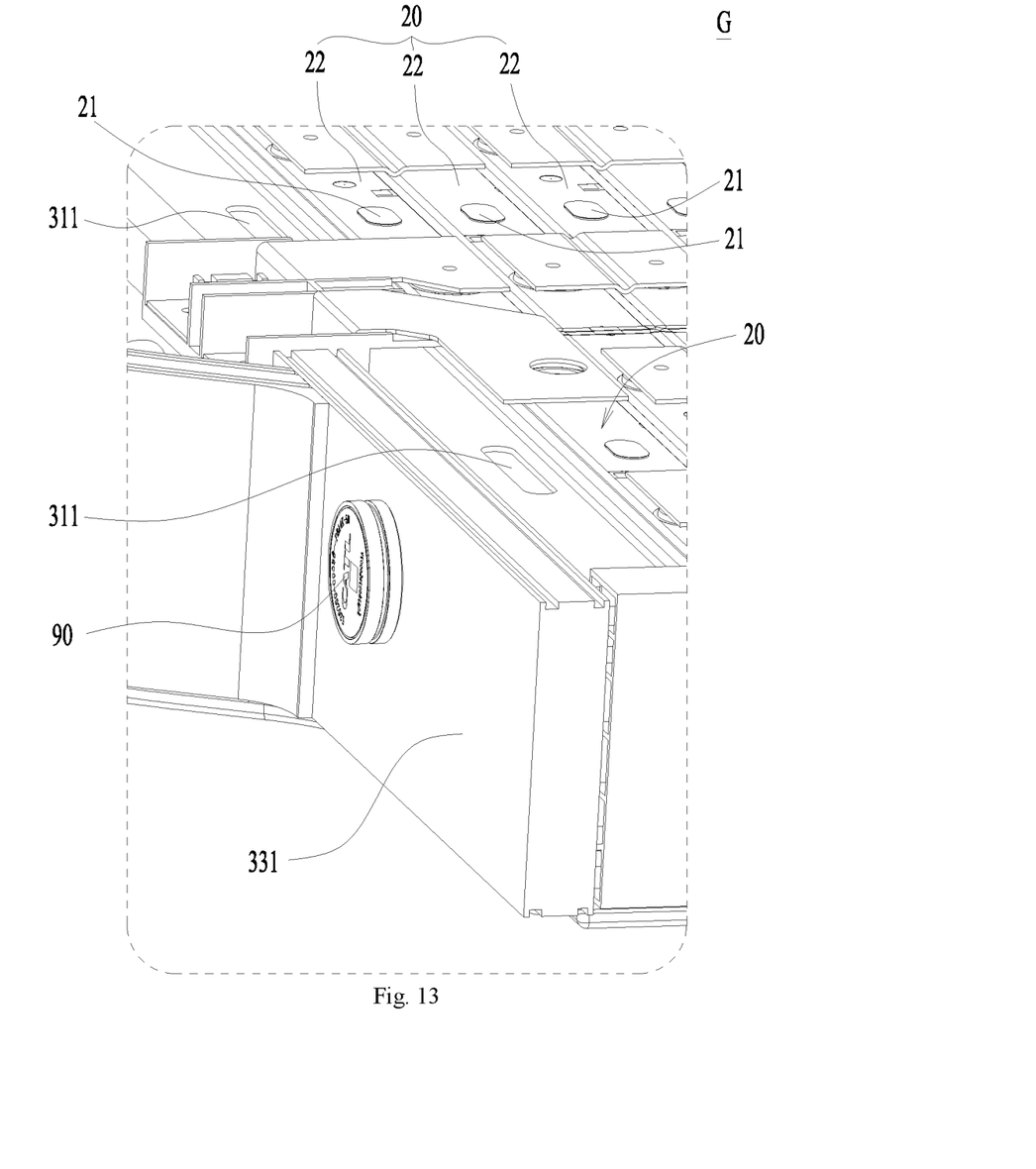
FIG. 13 is an enlarged view at G portion shown in FIG. 12.

In some embodiments, as shown in FIG. 12 and FIG. 13, the battery 10 further includes a pressure relief valve 90. The pressure relief valve 90 is disposed on the second side portion of the side plate 331 and covers the gas outlet 312 of the gas discharge passage 31. The casing 30 includes the side plate 331 and the connecting plate 332. The pressure relief valve 90 is detachably connected to the second side portion of the side plate 331 of the casing 30. For example, the pressure relief valve 90 is connected to the side plate 331 by screws. The pressure relief valve 90 is configured to be actuated to relieve the pressure when the pressure or temperature within the gas discharge passage 31 reaches a threshold value. The gas generated when the thermal runaway occurs in the battery module 20 inside the casing 30 is guided to the gas discharge passage 31 through the gas guide passage 50, and then the pressure relief valve 90 is actuated under the action of the gas and is thus switched from a normally closed state to an open state, thereby ensuring that the gas can be timely and quickly discharged to the external environment through the pressure relief valve 90. When the battery 10 is in a normal working state, since the pressure relief valve 90 in the normally closed state covers the gas outlet 312 of the gas discharge passage 31, the pressure relief valve 90 can prevent liquid water and impurities from entering the interior of the casing 30 through the gas discharge passage 31, thereby reducing the possibility that liquid water and impurities have adverse effects on the battery module 20. In an example, the pressure relief valve 90 may be a one-way valve.

The battery 10 according to the embodiment of the present disclosure includes the casing 30, the battery modules 20, and the flow guide member 40. The battery modules 20 and the flow guide member 40 are both disposed inside the casing 30. The casing 30 includes the gas discharge passage 31. The flow guide member 40 and the casing 30 are of split structures. The flow guide member 40 shields the explosion-proof assembly 21 of the battery module 20. When the thermal runaway occurs in the battery module 20, the explosion-proof assembly 21 will be destroyed to release high-temperature and high-pressure gas. The gas guide passage 50 can guide the gas released from the explosion-proof assembly 21 to the gas discharge passage 31, and then the gas can be discharged to the outside of the casing 30 through the gas discharge passage 31. In this way, the gas generated when the thermal runaway occurs in the battery module 20 will flow along a predetermined direction and be discharged out of the casing 30, so the gas is not prone to flowing and spreading to the surroundings in the casing 30, thereby effectively reducing the possibility that other battery modules 20 catch fire and then explode due to the gas spreading to other battery modules 20, facilitating improving the use safety of the battery 10.

An embodiment of the present disclosure also provides a manufacturing method of the battery 10, including:

disposing the battery module 20 including the explosion-proof assembly 21 inside the casing 30 including the gas discharge passage 31, the gas discharge passage 31 including the gas inlet 311 and the gas outlet 312; and disposing the flow guide member 40 inside the casing 30 and shielding the explosion-proof assembly 21 to form the gas guide passage 50, the gas guide passage 50 being in communication with the gas inlet 311, for guiding the gas generated by the battery module 20 to an exterior of the casing 30 through the gas outlet 312 after the explosion-proof assembly 21 is destroyed.

In some embodiments, the casing 30 includes the cover 32 and the housing 33. The cover 32 is connected to the housing 33. In the step of disposing the battery module 20 including the explosion-proof assembly 21 inside the casing 30 including the gas discharge passage 31, the battery module 20 is disposed inside the housing 33, and then the cover 32 is covered onto the housing 33. The gas discharge passage 31 is disposed on the housing 33. In the step of disposing the flow guide member 40 inside the casing 30 and shielding the explosion-proof assembly 21 to form the gas guide passage 50, the flow guide member 40 is connected and fixed to the cover 32 in advance, and then the cover 32 is covered onto the housing 33. The flow guide member 40 shields the explosion-proof assembly 21, and the gas guide passage 50 is enclosed and formed by the flow guide member 40 and the battery module 20.

In the battery 10 manufactured by the manufacturing method of the battery 10 according to the embodiment of the present disclosure, the flow guide member 40 shields the explosion-proof assembly 21 of the battery module 20. The gas guide passage 50 and the gas discharge passage 31 may guide the gas to flow along the predetermined path. In this way, the provision of the gas guide passage 50 and the gas discharge passage 31 can reduce the possibility that other battery modules 20 that have not undergone thermal runaway catch fire and then explode due to the gas released by the battery module 20 that has undergone thermal runaway spreading freely to the surroundings, thereby improving the use safety of the battery 10.

An embodiment of the present disclosure also provide a manufacturing system of battery 10, including:

a first assembling device, which is configured to dispose the battery module 20 including the explosion-proof assembly 21 inside the casing 30 including the gas discharge passage 31, the gas discharge passage 31 including the gas inlet 311 and the gas outlet 312; and a second assembling device, which is configured to dispose the flow guide member 40 inside the casing 30 and to shield the explosion-proof assembly 21 to form the gas guide passage 50, the gas guide passage 50 being in communication with the gas inlet 311, for guiding the gas generated by the battery module 20 to an exterior of the casing 30 through the gas outlet 312 after the explosion-proof assembly 21 is destroyed.

In some embodiments, the casing 30 includes the cover 32 and the housing 33. The cover 32 is connected to the housing 33. The gas discharge passage 31 is disposed on the housing 33. By using the first assembling device, the battery module 20 is disposed inside the housing 33, and then the cover 32 is covered onto the housing 33. By using the second assembling device, the flow guide member 40 is connected and fixed to the cover 32 in advance, and then the cover 32 is covered onto the housing 33. The flow guide member 40 shields the explosion-proof assembly 21, and the gas guide passage 50 is enclosed and formed by the flow guide member 40 and the battery module 20.

Although the present disclosure has been described with reference to the preferred embodiments, various modifications may be made thereto and components thereof may be replaced with equivalents without departing from the scope of the present disclosure. In particular, as long as there is no structural conflict, the technical features mentioned in the embodiments can be combined in any manner. The present disclosure is not limited to the specific embodiments disclosed herein, but includes all technical solutions that fall within the scope of the claims.

What is claimed is:

1. A battery, comprising:
   a battery module comprising an explosion-proof assembly;
   a casing, which is configured to accommodate the battery module, the casing comprising a gas discharge passage, and the gas discharge passage comprising a gas inlet and a gas outlet;
   a flow guide member, which is disposed inside the casing and shields the explosion-proof assembly to form a gas guide passage, the gas guide passage being in communication with the gas inlet, for guiding gas generated by the battery module to an exterior of the casing through the gas outlet after the explosion-proof assembly is destroyed, wherein:
   the casing comprises a cover and a housing for accommodating the battery module, the housing comprises two side plates to which the cover is connected;
   an accommodating portion is formed at a connection position between the cover and one of the two side plates, the gas discharge passage is disposed in the one of the two side plates, and the gas inlet of the gas discharge passage is in communication with the accommodating portion; and
   the one of the two side plates comprises an upper portion, a first side portion, and a second side portion, the first side portion and the second side portion are each connected to the upper portion and are spaced apart from each other in a thickness direction of the one of the two side plates, the second side portion is disposed away from the battery module relative to the first side portion, the gas inlet of the gas discharge passage is disposed to penetrate the upper portion, and the gas outlet of the gas discharge passage is disposed to penetrate the second side portion; and
   the accommodating portion is formed above the gas inlet of the gas discharge passage and communicates the gas guide passage with the gas inlet of the gas discharge passage such that a gas exchange between the gas guide passage and the gas inlet of the gas discharge passage occurs at the accommodating portion.

2. The battery as claimed in claim 1, wherein the gas guide passage is enclosed and formed by the flow guide member and the battery module, and the explosion-proof assembly is located in the gas guide passage.

3. The battery as claimed in claim 1, wherein the battery module comprises a connecting piece comprising a gas flow passage, the connecting piece is configured to be connected with the flow guide member, and the gas guide passage is communication with the gas inlet through the gas flow passage.

4. The battery as claimed in claim 2, wherein the battery module comprises a connecting piece comprising a gas flow passage, the connecting piece is configured to be connected with the flow guide member, and the gas guide passage is communication with the gas inlet through the gas flow passage.

5. The battery as claimed in claim 1, wherein the battery module comprises a connecting piece comprising a gas flow passage, the connecting piece and the flow guide member are integrally formed, and the gas guide passage is communication with the gas inlet through the gas flow passage.

6. The battery as claimed in claim 5, wherein the explosion-proof assembly is disposed facing the cover, and the flow guide member is configured to be connected with the cover.

7. The battery as claimed in claim 6, wherein at least a portion of the connecting piece is located within the accommodating portion.

8. The battery as claimed in claim 7, wherein the two side plates are spaced from each other, the battery module is arranged between the two side plates, and the gas guide passage extends from one of the two side plates towards the other of the two side plates.

9. The battery as claimed in claim 7, wherein a number of the battery module is the same as a number of the flow guide member, and one battery module is provided correspondingly with one flow guide member, for guiding gas generated after the explosion-proof assembly of each battery module is destroyed.

10. The battery as claimed in claim 9, wherein the gas discharge passage further comprises a confluence chamber, the gas inlet and the gas outlet are each in communication with the confluence chamber, a number of the gas inlet is equal to a number of the flow guide member, and one gas inlet is in communication with one gas flow passage.

11. The battery as claimed in claim 7, wherein a sealing member is disposed between the flow guide member and the battery module to seal the gas guide passage such that the gas flows to the gas inlet along the gas guide passage.

12. The battery as claimed in claim 1, wherein the battery further comprises a pressure relief valve, the pressure relief valve is disposed on the second side portion of the one of the two side plates and covers the gas outlet, the pressure relief valve is configured to be actuated to relieve pressure when pressure or temperature within the gas discharge passage reaches a threshold value.

13. An electric device comprising the battery as claimed in claim 1 for providing electrical energy.

14. The battery as claimed in claim 1, wherein the flow guide member comprises a first plate and two or more second plates, the first plate shields the explosion-proof assembly, the two or more second plates extend from the first plate toward the battery module, respectively, and the gas guide passage is enclosed and formed by the first plate, the two or more second plates, and the battery module.

15. The battery as claimed in claim 14, wherein the first plate is detachably connected to the casing or the first plate is welded to the casing.

16. The battery as claimed in claim 1, wherein a sealing member is disposed between the battery module and the one of the two side plates.

* * * * *